United States Patent
Smith, III et al.

(10) Patent No.: US 10,767,558 B2
(45) Date of Patent: Sep. 8, 2020

(54) ADAPTIVE-CURVATURE INERTIAL PARTICLE SEPARATORS

(71) Applicant: Rolls-Royce North American Technologies Inc., Indianapolis, IN (US)

(72) Inventors: Crawford F. Smith, III, Carmel, IN (US); Bryan H. Lerg, Carmel, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 106 days.

(21) Appl. No.: 15/914,589

(22) Filed: Mar. 7, 2018

(65) Prior Publication Data
US 2019/0277198 A1    Sep. 12, 2019

(51) Int. Cl.
| | | |
|---|---|---|
| F02C 7/052 | (2006.01) | |
| F02C 7/042 | (2006.01) | |
| B64D 33/02 | (2006.01) | |
| B01D 45/06 | (2006.01) | |

(52) U.S. Cl.
CPC .............. F02C 7/052 (2013.01); F02C 7/042 (2013.01); B01D 45/06 (2013.01); B64D 2033/0246 (2013.01); F05D 2250/90 (2013.01); F05D 2260/607 (2013.01); F05D 2300/505 (2013.01)

(58) Field of Classification Search
CPC ........ F04D 29/70; F04D 29/701; F02C 7/042; F02C 7/052; B01D 45/00; B01D 45/04; B01D 45/06; B01D 45/12; B01D 45/16; B01D 45/32; F02M 35/022; B64D 2033/02; B64D 2033/0246; F05D 2250/90; F05D 2260/607; F05D 2300/505

USPC ...................................................... 415/121.2
See application file for complete search history.

(56) References Cited

U.S. PATENT DOCUMENTS

| | | | |
|---|---|---|---|
| 2,925,997 A | * | 2/1960 | Hart ...................... F01D 5/3053 416/215 |
| 3,444,672 A | | 5/1969 | Alsobrooks |
| 3,465,950 A | | 9/1969 | Freid et al. |
| 3,521,431 A | | 7/1970 | Connors et al. |
| 3,534,548 A | | 10/1970 | Connors |
| 3,616,616 A | | 11/1971 | Flatt |
| 3,673,771 A | | 7/1972 | Dickey |
| 3,733,814 A | | 5/1973 | Hull, Jr. et al. |
| 3,778,983 A | | 12/1973 | Rygg |
| 3,832,086 A | | 8/1974 | Hull, Jr. et al. |
| 3,970,439 A | | 7/1976 | Murphy |
| 3,979,903 A | | 9/1976 | Hull et al. |

(Continued)

FOREIGN PATENT DOCUMENTS

| | | |
|---|---|---|
| CN | 205618256 U | 10/2016 |
| EP | 1908939 A2 | 4/2008 |

OTHER PUBLICATIONS

Extended European Search Report, European Application No. 19156013.5-1007, dated Jul. 9, 2019, 9 pages.

Primary Examiner — Woody A Lee, Jr.
Assistant Examiner — Justin A Pruitt
(74) Attorney, Agent, or Firm — Barnes & Thornburg LLP

(57) ABSTRACT

A particle separator adapted for use with a gas turbine engine includes an inner wall, an outer wall, and a splitter. The splitter cooperates with the inner wall and the outer wall to separate particles suspended in an inlet flow moving through the particle separator to provide a clean flow of air to the gas turbine engine.

13 Claims, 6 Drawing Sheets

(56) References Cited

U.S. PATENT DOCUMENTS

| | | | |
|---|---|---|---|
| 3,998,048 A | | 12/1976 | Derue |
| 4,196,856 A | * | 4/1980 | James .................. F02K 1/1223 |
| | | | 239/265.39 |
| 4,509,962 A | | 4/1985 | Breitman et al. |
| 4,592,765 A | | 6/1986 | Breitman et al. |
| 4,617,028 A | | 10/1986 | Ray et al. |
| 4,702,071 A | | 10/1987 | Jenkins et al. |
| 4,704,145 A | | 11/1987 | Norris et al. |
| 4,860,534 A | | 8/1989 | Easley et al. |
| 4,881,367 A | | 11/1989 | Flatman |
| 4,928,480 A | | 5/1990 | Oliver et al. |
| 5,039,014 A | * | 8/1991 | Lippmeier ................ F02K 1/12 |
| | | | 239/265.33 |
| 5,039,317 A | | 8/1991 | Thompson et al. |
| 5,139,545 A | | 8/1992 | Mann |
| 5,226,455 A | * | 7/1993 | duPont .................. B64D 33/02 |
| | | | 137/15.1 |
| 5,279,109 A | | 1/1994 | Liu et al. |
| 6,134,874 A | | 10/2000 | Stoten |
| 6,499,285 B1 | | 12/2002 | Snyder |
| 6,702,873 B2 | | 3/2004 | Hartman |
| 7,608,122 B2 | | 10/2009 | Snyder |
| 8,015,787 B2 | | 9/2011 | Snyder |
| 9,046,056 B2 | | 6/2015 | Lerg |
| 9,284,914 B2 | | 3/2016 | Webster |
| 2003/0196548 A1 | * | 10/2003 | Hartman ............ B01D 46/0043 |
| | | | 95/8 |
| 2008/0047425 A1 | | 2/2008 | Loda et al. |
| 2009/0139398 A1 | | 6/2009 | Sheoran et al. |
| 2014/0237954 A1 | | 8/2014 | Snyder |
| 2016/0010558 A1 | * | 1/2016 | Hussain ................ F01D 17/105 |
| | | | 415/175 |
| 2016/0265435 A1 | | 9/2016 | Snyder |

\* cited by examiner

ADAPTIVE-CURVATURE INERTIAL PARTICLE SEPARATORS

FIELD OF THE DISCLOSURE

The present disclosure relates generally to gas turbine engines, and more specifically to particle separators adapted for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the fuel and air is ignited. Products of the combustion reaction in the combustor are directed into the turbine where work is extracted to drive the compressor and, sometimes, an output shaft. Leftover products of the combustion are exhausted out of the turbine and may provide thrust in some applications.

Air is drawn into the engine through an air inlet and communicated to the compressor via an air-inlet duct. In some operating conditions, particles may be entrained in the air such as dust, sand, ash, or water and may be drawn into the air inlet and passed through the air-inlet duct to the compressor. Such particles may impact components of the compressor and turbine causing unintended wear. This unintended wear may decrease power output of the engine, shorten the life span of the engine, and lead to increased maintenance costs and increased down time of the engine.

One method of separating particles from air entering the compressor has been by inertial particle separation. Inertial particle separation uses the inertia of the particles to separate the particles from the air. As the air stream moves through the air-inlet duct, the air moves along a serpentine flow path and enters an engine channel of the air-inlet duct while the particles move along a generally linear travel path and enter a scavenge channel of the particle separator.

SUMMARY

The present disclosure may comprise one or more of the following features and combinations thereof.

A particle separator may include an adaptive-curvature inner wall arranged circumferentially about an axis, an outer wall, a splitter, and a control system. The outer wall may be arranged circumferentially about the adaptive-curvature inner wall to define an inlet passage of the particle separator. The inlet passage may be adapted to receive a mixture of air and particles suspended in the air. The splitter may be located radially between the outer wall and the adaptive-curvature inner wall to separate the mixture of air and particles into a clean flow substantially free of particles and a dirty flow containing the particles during operation of the particle separator. The splitter and the adaptive-curvature inner wall may define an engine channel arranged to receive the clean flow. The splitter and the outer wall may define a scavenge channel arranged to receive the dirty flow.

The control system may be configured to detect the presence of the particles suspended in the air. The control system may be configured to move selectively the adaptive-curvature inner wall between a non-austere arrangement in which the adaptive-curvature inner wall has a first maximum radius and an austere arrangement in which the adaptive-curvature inner wall has a second maximum radius greater than the first maximum radius in response to the control system detecting the presence of the particles.

In some embodiments, the adaptive-curvature inner wall may include a plurality of overlapping leaves. Each of plurality of overlapping leaves may be configured to slide relative to one another in response to the adaptive-curvature inner wall moving between the first arrangement and the second arrangement.

In some embodiments, the plurality of overlapping leaves may include a first leaf and a second leaf located downstream of the first leaf. The first leaf and the second leaf may each include a fore end and an aft end spaced axially apart from the fore end. The aft end of the first leaf may be located radially outward and overlap the fore end of the second leaf. In some embodiments, the plurality of overlapping leaves may define an internal cavity that is in fluid communication with a pressurized air source.

In some embodiments, the control system may include a linear actuator configured to move the adaptive-curvature inner wall between the non-austere arrangement and the austere arrangement. In some embodiments, the control system may include a pneumatic bladder configured to move the adaptive-curvature inner wall between the non-austere arrangement and austere second arrangement.

In some embodiments, the adaptive-curvature inner wall may include a rotor, a plurality of leaves, and a plurality of support struts. The rotor may extend axially relative to the axis. The plurality of leaves may be arranged circumferentially about the rotor. The plurality of support struts may be pivotably coupled to the rotor and pivotably coupled to the plurality of leaves. In some embodiments, the control system may be configured to rotate selectively the rotor about the axis to move the plurality of leaves radially inward and outward to cause the adaptive-curvature inner wall to move between the non-austere arrangement and the austere arrangement.

In some embodiments, the adaptive-curvature inner wall may include a surface layer that extends at least partway about the axis and a plurality of heating elements located radially inward of the surface layer. The surface layer may comprise shape memory alloy. The control system may be configured to cause the plurality of heating elements to heat the surface layer to cause the adaptive-curvature inner wall to move from the non-austere arrangement to the austere arrangement.

In some embodiments, the plurality of heating elements may be spaced apart axially from one another. The control system may be configured to power each of the plurality of heating elements individually to control a contour of the surface layer.

According to another aspect of the present disclosure, a method includes a number of steps. The method may include providing a particle separator that includes an inner wall, an outer wall arranged around the inner wall to define an inlet passageway, and a splitter located between the inner wall and the outer wall, providing a mixture of air and particles suspended in the air to the inlet passageway, separating the mixture of air and particles suspended in the air into a dirty flow including substantially all the particles and a clean flow lacking substantially all the particles, detecting the particles suspended in the mixture of air and particles, and moving at least a portion of the inner wall toward the outer wall in response to detecting the particles.

In some embodiments, the splitter and the inner wall may define an engine channel. The splitter and the outer wall may define a scavenge channel. The inlet passageway may be in fluid communication with the engine channel and the scavenge channel. The detecting step may include detecting particles in the inlet passageway.

In some embodiments, the splitter and the inner wall may define an engine channel. The splitter and the outer wall may define a scavenge channel. The inlet passageway may be in fluid communication with the engine channel and the scavenge channel. The detecting step may include detecting the particles in the engine channel.

In some embodiments, the splitter may be fixed in position relative to the outer wall. In some embodiments, the inner wall may define an internal cavity. The method may further include providing pressurized fluid to the internal cavity.

In some embodiments, the inner wall may include a first leaf and a second leaf. The first leaf may overlap the second leaf. The moving step may include sliding the first leaf relative to and over the second leaf.

In some embodiments, the second leaf may be located downstream of the first leaf. The first leaf and the second leaf may each include a fore end and an aft end spaced axially apart from the fore end. The aft end of the first leaf may be located radially outward and overlap the fore end of the second leaf.

In some embodiments, the inner wall may define an internal cavity. The method may further include providing pressurized fluid to the internal cavity.

In some embodiments, the inner wall may comprise shape memory alloy materials. The moving step may include heating the inner wall.

In some embodiments, the inner wall may include a rotor that extends along an axis. The plurality of leaves may be arranged circumferentially about the rotor. The plurality of support struts may be pivotably coupled to the rotor and may be pivotably coupled to the plurality of leaves. In some embodiments, the moving step may include rotating the rotor about the axis to move the plurality of leaves radially.

These and other features of the present disclosure will become more apparent from the following description of the illustrative embodiments.

DETAILED DESCRIPTION OF THE DRAWINGS

Figure 1:
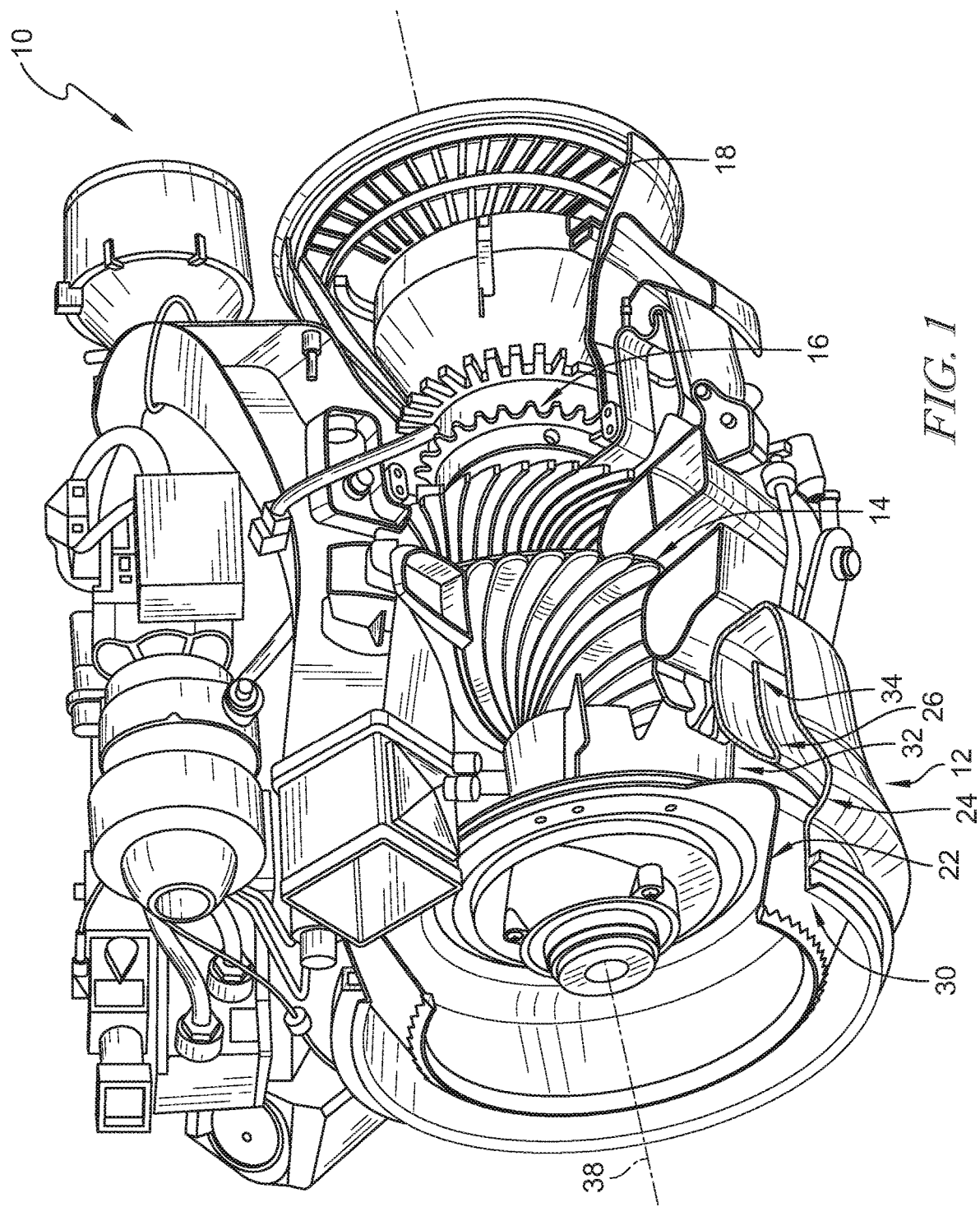
FIG. 1 is a cut-away perspective view of a gas turbine engine having a particle separator in accordance with the present disclosure, the gas turbine engine including the particle separator, a compressor section, a combustor section, and a turbine section.

For the purposes of promoting an understanding of the principles of the disclosure, reference will now be made to a number of illustrative embodiments illustrated in the drawings and specific language will be used to describe the same.

A gas turbine engine 10 in accordance with the present disclosure is shown, for example, in FIG. 1. The gas turbine engine 10 includes a particle separator 12, a compressor section 14, a combustor section 16, and a turbine section 18. Air is drawn into the gas turbine engine 10 through particle separator 12 prior to admission of the air into the compressor section 14 as suggested in FIGS. 1 and 2. The compressor section 14 compresses the air drawn into the engine 10 and delivers high-pressure air to the combustor section 16. The combustor section 16 is configured to ignite a mixture of the compressed air and fuel. Products of the combustion process are directed into the turbine section 18 where work is extracted to drive the compressor section 14 and a fan, propeller, output shaft, or gearbox.

In some environments, particles such as dirt, sand, ash, and/or water may be entrained in the air surrounding the engine 10. Such environments may be referred to as austere conditions. In contrast, environments having relatively low or no particles may be referred to as non-austere conditions. The particles may be carried into the gas turbine engine 10 and possibly damage and wear engine components. The illustrative particle separator 12 is configured to separate the particles from the air to provide clean air substantially free from particles to the compressor section 14 so that damage to the engine 10 is minimized.

Figure 2:
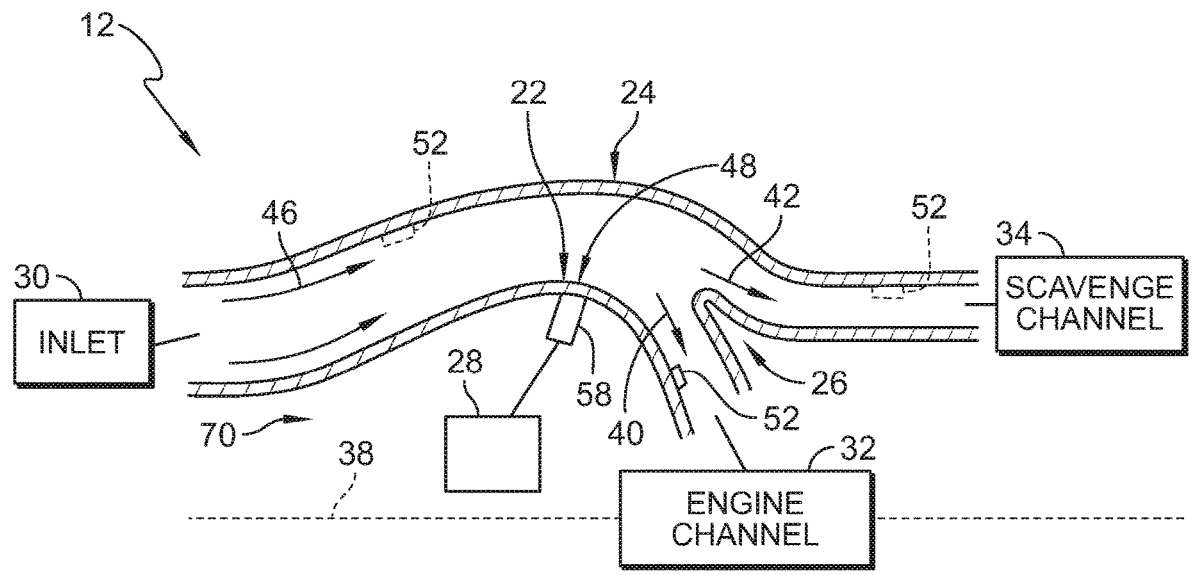
FIG. 2 is an enlarged section and diagrammatic view of the particle separator of FIG. 1 showing that the particle separator includes an adaptive-curvature inner wall arranged circumferentially about an axis, an outer wall arranged circumferentially about the adaptive-curvature inner wall to define an inlet passageway into the particle separator, and a splitter located between the adaptive-curvature inner wall and the outer wall to define an engine channel and a scavenge channel.
Figure 3:
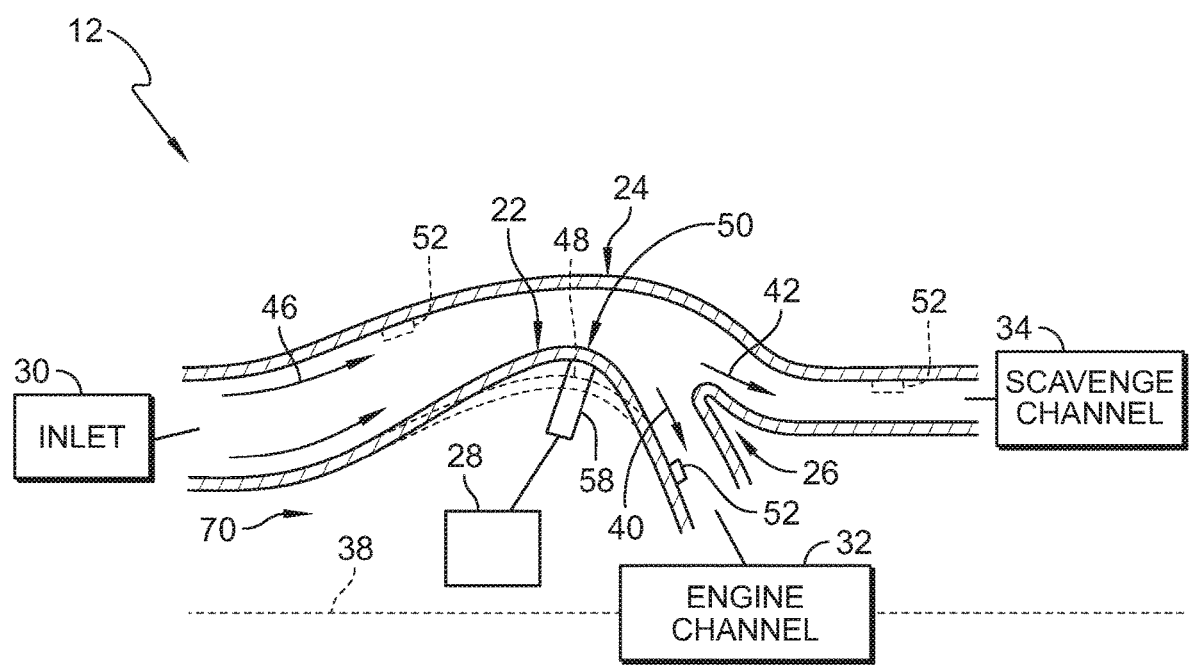
FIG. 3 is a view similar to FIG. 2 showing that the adaptive-curvature inner wall has moved toward the outer wall in response to the detection of particles suspended in the airflow provided to the inlet passageway of the particle separator.

The illustrative particle separator 12 includes an adaptive-curvature inner wall 22, an outer wall 24, a splitter 26, and a control system 28 as shown in FIG. 2. The adaptive-curvature inner wall 22 is annular and is located in spaced-apart relation to an engine rotation axis 38. The outer wall 24 is also annular and is arranged circumferentially around the adaptive-curvature inner wall 22 and the engine rotation axis 38. The adaptive-curvature inner wall 22 and the outer wall 24 cooperate to define an air-inlet passageway 30 therebetween as shown in FIGS. 2 and 3. In the illustrative embodiment, the adaptive-curvature inner wall 22 defines an internal cavity 70 as shown in FIG. 2.

The splitter 26 is located between the adaptive-curvature inner wall 22 and the outer wall 24 as shown in FIG. 2. The splitter 26 cooperates with the adaptive-curvature inner wall 22 to define an engine channel 32 therebetween as shown in FIG. 2. The splitter 26 cooperates with the outer wall 24 to define the scavenge channel 34 therebetween. The splitter 26 separates the flow of air and particles that are conducted into the air-inlet passageway into a clean flow 40 and a dirty flow 42 as suggested in FIG. 2. The clean flow 40 is conducted to the compressor section 14 via the engine channel 32. The dirty flow 42 is conducted to the scavenge channel 34. The splitter 26 is fixed in position relative to the outer wall 24 in the illustrative embodiments.

In use, an inlet flow 46 is conducted into the air-inlet passageway 30 of the particle separator as suggested in FIG. 2. The control system 28 is configured to detect the presence of the particles suspended in the inlet flow 46 and to move selectively the adaptive-curvature inner wall 22 between a non-austere arrangement, shown in FIG. 2, and an austere arrangement, shown in FIG. 3, in response to the control system 28 detecting the particles. In the non-austere arrangement, the adaptive-curvature inner wall 22 has a first maximum radius 48. In the austere arrangement, the adaptive-curvature inner wall 22 has a second maximum radius 50 that is greater than the first maximum radius 48.

In non-austere conditions, the hub geometry of the adaptive-curvature inner wall 22 would retract and assume the non-austere arrangement to provide a low pressure loss flow path. In austere conditions, the hub geometry of the adaptive-curvature inner wall 22 would expand radially to force particulates into the scavenge channel 34.

In some embodiments, the control system 28 includes a sensor 52 located in the air-inlet passageway 30 so that the control system 28 detects the particles in the air-inlet passageway 30. In some embodiments, the control system 28 includes the sensor 52 located in the engine channel 32 so that the control system 28 detects the particles in the engine channel 32. In some embodiments, the control system 28 includes the sensor 52 located in the scavenge channel 34 so that the control system 28 detects the particles in the scavenge channel 34.

In some embodiments, the control system 28 includes one or more actuators 58 configured to move the adaptive-curvature inner wall 22. A diagrammatic actuator 58 is shown in FIGS. 2 and 3. The actuators 58 may include linear actuators, pneumatic or fluid bladders, heating elements, rotatable rotors, or any other suitable alternative. The control system 28 may include a plurality of actuators 58, for example, to control precisely a contour of the adaptive-curvature inner wall 22.

The illustrative particle separator 12 comprises a radially inward turning particle separator 12 as shown in FIG. 2. In other embodiments, the particle separator 12 comprises an inward turning particle separator, outward turning particle separator, linear type particle separator, dual path type particle separator, multi-path particle separators, or any combination thereof.

Figure 4:
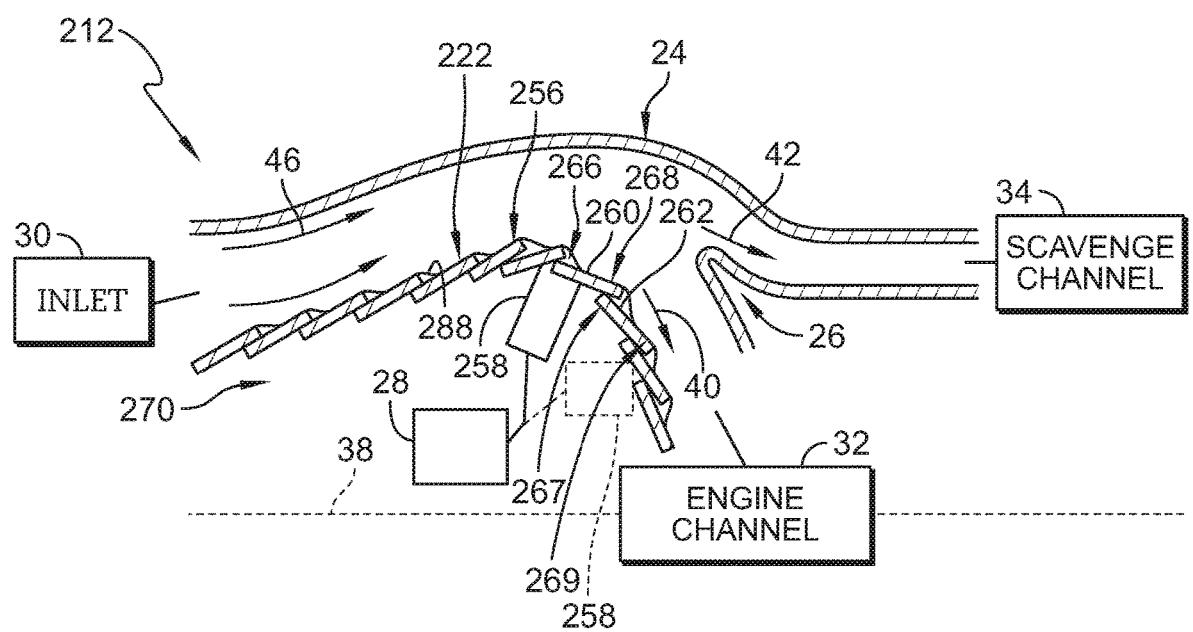
FIG. 4 is a diagrammatic similar to FIG. 2 showing one embodiment of a particle separator having a plurality of overlapping leaves configured to move relative to one another in response to movement of the adaptive-curvature inner wall.

An embodiment of a particle separator 212 in accordance with the present disclosure is shown in FIG. 4. The particle separator 212 is substantially similar to the particle separator 12 shown in FIGS. 1-3 and described herein. Accordingly, similar reference numbers in the 200 series indicate features that are common between the particle separator 12 and the particle separator 212. The description of the particle separator 12 is incorporated by reference to apply to the particle separator 212, except in instances when it conflicts with the specific description and the drawings of the particle separator 212.

The particle separator 212 includes an adaptive-curvature inner wall 222, the outer wall 24, the splitter 26, and control system 28 as shown in FIG. 4. The adaptive-curvature inner wall 222 includes a plurality of overlapping leaves 256 and the control system 28 includes an actuator 258.

The plurality of overlapping leaves 256 are configured to slide relative to one another in response to the adaptive-curvature inner wall 222 moving between the first arrangement and the second arrangement. The actuator 258 is coupled to the plurality of leaves 256 and the control system 28. The actuator 258 is configured to move the plurality of leaves 256 in response to the control system 28 detecting the particles to move the adaptive-curvature inner wall 222 from the non-austere arrangement to the austere arrangement.

Figure 4A:
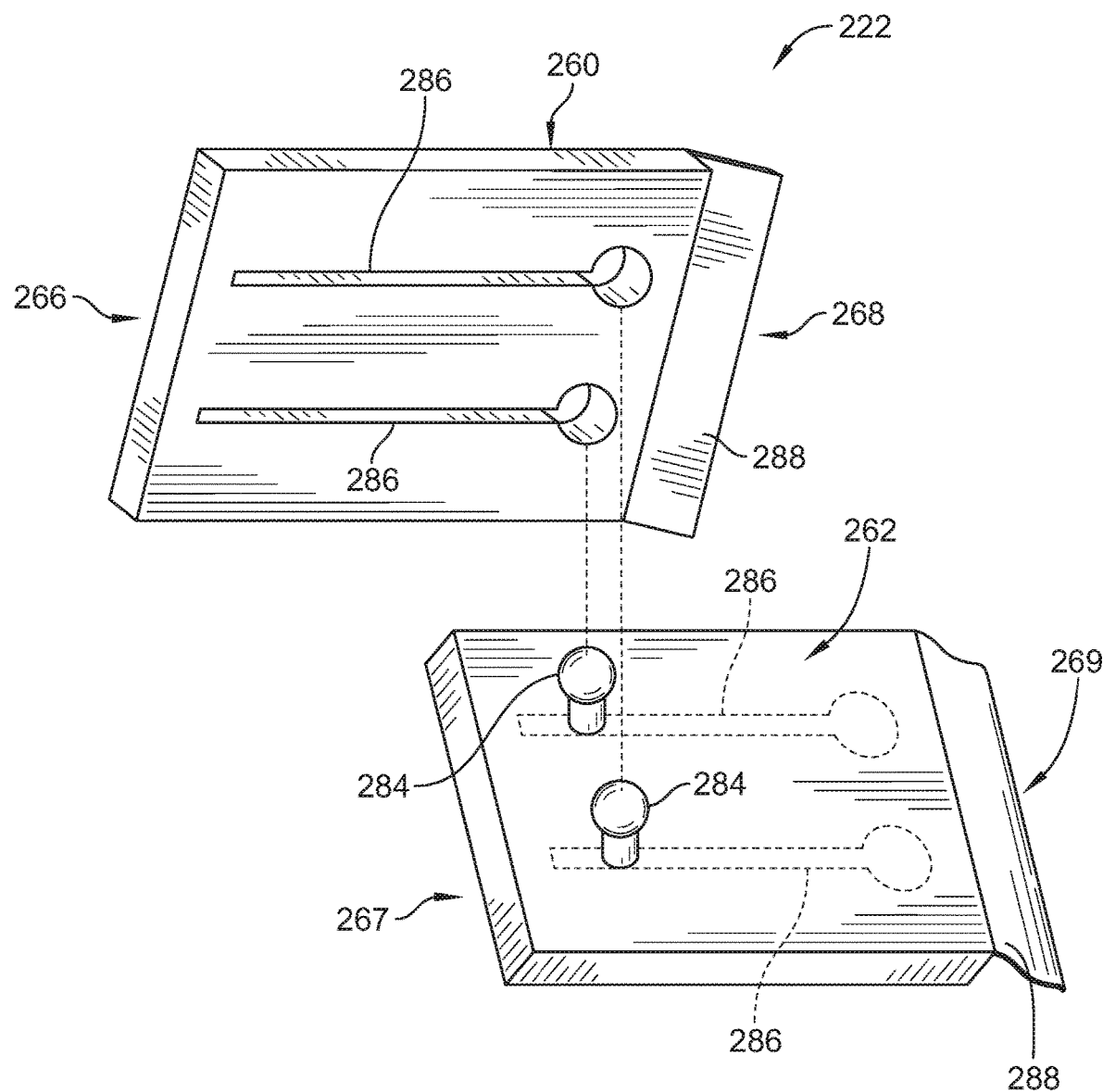
FIG. 4A is an exploded view of a pair of overlapping leaves included in the particle separator of FIG. 4.

The plurality of overlapping leaves 256 includes a first leaf 260 and a second leaf 262 located downstream of the first leaf as shown in FIGS. 4 and 4A. The first leaf 260 includes a fore end 266 and an aft end 268 spaced axially apart from the fore end 266. The second leaf 262 includes a fore end 267 and an aft end 269 spaced axially apart from the fore end 267. The aft end 268 of the first leaf 260 is located radially outward and overlaps the fore end 267 of the second leaf 262. Illustratively, the aft end of each leaf is located radially outward and overlaps the fore end of the downstream adjacent leaf. As such, the chance of air and particles catching on abrupt surfaces of the leaves 256 is minimized.

The plurality of overlapping leaves 256 are configured to slide relative to one another in the illustrative embodiment as suggested in FIG. 4A. The plurality of overlapping leaves 256 each include one or more pins 284 and one or more pin-receiving slots 286 as shown in FIG. 4A. The pins 284 included in the second leaf 262 are adapted to be received in the pin-receiving slots 286 formed in the first leaf 260 as suggested in FIG. 4A. The pin-receiving slots 286 are axially extending and allow the pins 284 to slide in the slots. Each of the plurality of overlapping leaves 256 further include flap seals 288 configured to provide a transition surface between leaves 256 and to block particles from flowing between leaves 256.

In the illustrative embodiment, the plurality of overlapping leaves 256 defines an internal cavity 270 as shown in FIG. 4. The internal cavity 270 is in fluid communication with a pressurized air source 272 configured to pressurize the cavity to block particles from moving between leaves 256 and into the internal cavity 270.

In some embodiments, the actuator 258 includes a linear actuator configured to move the adaptive-curvature inner wall 222 between the non-austere arrangement and the austere arrangement. In some embodiments, the actuator 258 includes a pneumatic bladder configured to move the adaptive-curvature inner wall 222 between the non-austere arrangement and austere second arrangement.

Figure 5:
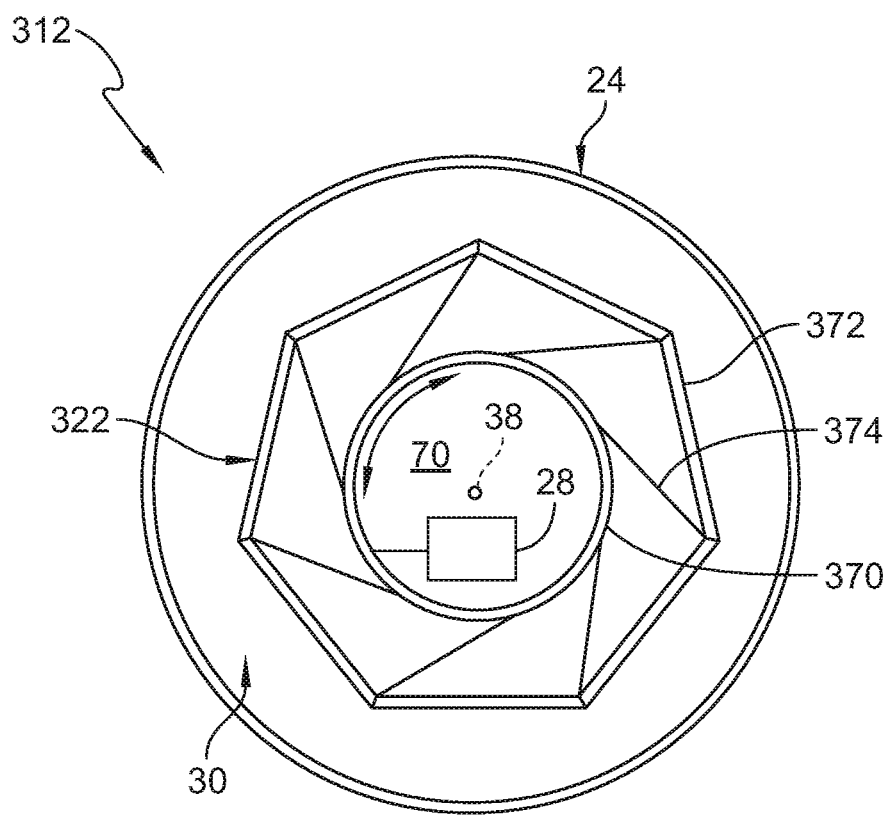
FIG. 5 is an front elevation and diagrammatic view showing another embodiment of a particle separator having a plurality of leaves arranged around an axis of the engine, the plurality of leaves being coupled to a rotor configured to rotate and move the plurality of leaves radially inward and outward to adjust an arrangement of the adjustable-curvature inner wall.

Another embodiment of a particle separator 312 in accordance with the present disclosure is shown in FIG. 5. The particle separator 312 is substantially similar to the particle separator 12 shown in FIGS. 1-3 and described herein. Accordingly, similar reference numbers in the 300 series indicate features that are common between the particle separator 12 and the particle separator 312. The description of the particle separator 12 is incorporated by reference to apply to the particle separator 312, except in instances when it conflicts with the specific description and the drawings of the particle separator 312.

The particle separator 312 includes an adaptive-curvature inner wall 322, the outer wall 24, the splitter 26, and the control system 28 as shown in FIG. 5. The adaptive-curvature inner wall 322 includes a rotor 370, a plurality of leaves 372, and a plurality of support struts 374. The rotor 370 extends axially relative to the axis 38. The plurality of leaves 372 are arranged circumferentially about the rotor 370 to locate radially the plurality of leaves 372 between the outer wall 24 and the rotor 370. The plurality of support struts 374 are pivotably coupled to the rotor 370 and pivotably coupled to the plurality of leaves 372.

The control system 28 is configured to rotate selectively the rotor 370 about the axis 38 to move the plurality of leaves 372 radially inward and outward to cause the adaptive-curvature inner wall 322 to move between the non-austere arrangement and the austere arrangement. When the rotor 370 rotates, the struts 374 urge the leaves 372 radially inward and outward. In the illustrative embodiment, each strut 374 is coupled pivotally to a pair of adjacent leaves 372. The struts 374 are about equally spaced apart from one another about the rotor 370.

Figure 6:
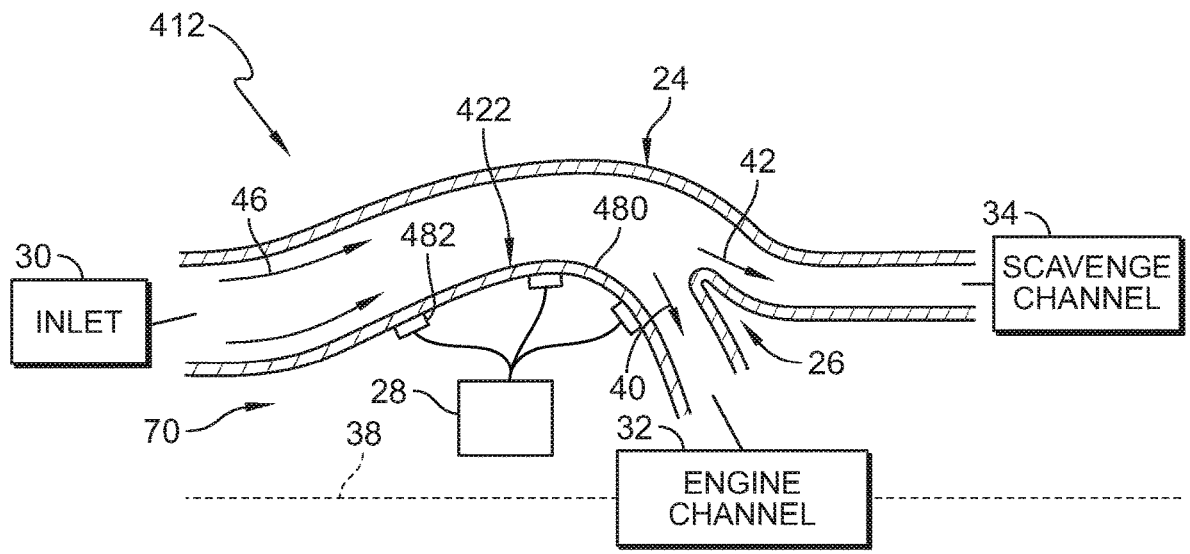
FIG. 6 is a section and diagrammatic view of another embodiment of a particle separator wherein the adaptive-curvature inner wall includes a surface comprising shape memory alloys and a plurality of heating elements configured to heat the surface.
Figure 7:
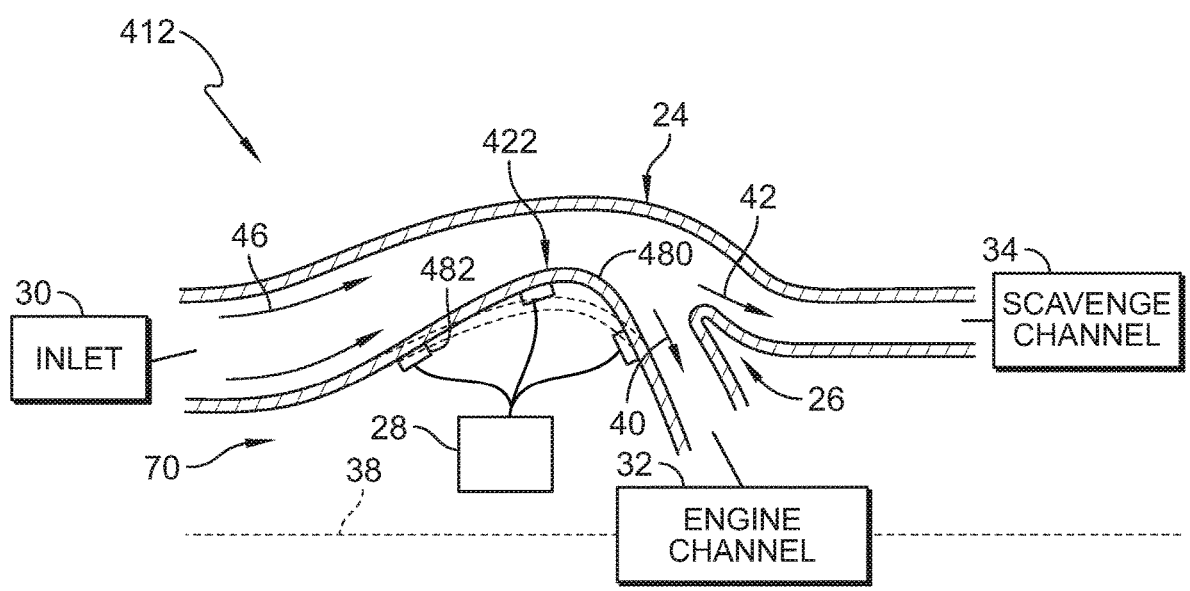
FIG. 7 is a view similar to FIG. 6 showing the surface of the adaptive-curvature inner wall has moved in response to being heated by the heating elements.

Another embodiment of a particle separator 412 in accordance with the present disclosure is shown in FIGS. 6 and 7. The particle separator 412 is substantially similar to the particle separator 12 shown in FIGS. 1-3 and described herein. Accordingly, similar reference numbers in the 400 series indicate features that are common between the particle separator 12 and the particle separator 412. The description of the particle separator 12 is incorporated by reference to apply to the particle separator 412, except in instances when it conflicts with the specific description and the drawings of the particle separator 412.

The particle separator 412 includes an adaptive-curvature inner wall 422, the outer wall 24, the splitter 26, and the control system 28 as shown in FIGS. 6 and 7. The adaptive-curvature inner wall 422 includes a surface layer 480 that extends at least partway about the axis 38 and a plurality of heating elements 482. Illustratively, the heating elements 482 are located radially inward of the surface layer 480. The surface layer 480 comprises Shape Memory Alloy material. The control system 28 is configured to cause the plurality of heating elements 482 to heat the surface layer 480 to cause the adaptive-curvature inner wall 422 to move from the non-austere arrangement shown in FIG. 6 to the austere arrangement shown in FIG. 7 in response to the control system 28 detecting the particles.

Illustratively, the plurality of heating elements 482 are spaced apart axially from one another. The control system 28 is configured to power each of the plurality of heating elements 482 individually to control a contour of the surface layer 480.

A method in accordance with the present disclosure includes providing a particle separator 12, 212, 312, 412 that includes an inner wall 22, 222, 322, 422, an outer wall 24 arranged around the inner wall 22, 222, 322, 422 to define an inlet passageway 30, and a splitter 26 located between the inner wall 22, 222, 322, 422 and the outer wall 24. The method further includes providing a mixture of air and particles suspended in the air to the inlet passageway 30. The method includes separating the mixture of air and particles suspended in the air into a dirty flow 42 including substantially all the particles and a clean flow 40 lacking substantially all the particles.

The method may include detecting the particles suspended in the mixture of air and particles. The method includes moving at least a portion of the inner wall 22, 222, 322, 422 toward the outer wall 24 in response to detecting the particles. In some embodiments, at least a portion of the inner wall 22, 222, 322, 422 is moved toward the outer wall 24 in response to operator input.

In some embodiments, the determining step includes detecting particles in the inlet passageway 30. In some embodiments, the determining step includes detecting the particles in the engine channel 32. In some embodiments, the method further includes providing pressurized fluid to the internal cavity defined by the inner wall 22, 222, 322, 422.

In some embodiments, the moving step includes sliding the first leaf 260 relative to and over the second leaf 262. In some embodiments, the inner wall 422 comprises shape memory alloy materials and the moving step includes heating the inner wall 422. In some embodiments, the moving step includes rotating the rotor 370 about the axis 38 to move the plurality of leaves 372 radially.

Fixed and rotary wing aircraft may operate in particulate laden environments such as deserts or beach areas. Small particulates can affect aircraft gas turbine engines, whether during conventional takeoff/landing or vertical take-off and landing. In flight, engines may ingest ice crystals or volcanic ash. Some of these engines may use filters to remove particulates from entering the gas turbine engine and therefore protect the hot section hardware from damage.

In the present application, the engine 10 includes an inertial particle separator (IPS) to remove a significant portion of particulates and expel them via a scavenge duct system outside of the aircraft. Aircraft may use turboshaft gas turbine engines to power the rotor blades. The inertial particle separators 12 may be located ahead of the engine and be included as part of the inlet duct system. As shown in FIGS. 2 and 3, atmospheric air enters the inlet passage "inflow" and the flow bifurcates into the engine inlet flow "core flow" and the bypass "scavenge flow" that carries the particulates away from the engine inlet by dumping the flow overboard.

Two approaches may be used increase the amount of particulates that are removed from an inertial particle separator. The scavenge ratio may be increased to increase the capture of particles into the scavenge duct. The flow turning may be increased to force more particles into the scavenge duct.

The scavenge ratio may be calculated as the ratio of the amount of flow entering the scavenge duct to the total flow entering the inlet. The amount of scavenge flow may be limited by the amount of the inlet flow the engine requires. Once this limit has been reached, another available option may be to increase the amount of flow turning in the duct.

The more the flow turning, the more particulates are forced into the scavenge duct. This increase in turning may be accomplished by increasing the maximum radial height of the hub of the inner wall 22 from the horizontal direction. The more flow turning may result in higher pressure losses in the flow that enters the engine.

It may be desirable to have the hub at a high flow turning position only when particulates are present (austere conditions). When no particulates are present (non-austere environment), the pressure loss may be much lower. This may be effectively changing the curvature of the hub surface. The present disclosure provides an approach to achieving this by incorporating a radially variable geometry hub into an inertial particle separator flow path. When particulates are present, the hub would expand radially to force particulates into the scavenge duct. When in non-austere conditions, the hub geometry would retract to a low pressure loss flow path. The present disclosure is applicable for inertial particle separators in turboshaft or turbofan applications.

A sensor could be used to detect the presence of particulates. An actuator could be used to push the hub geometry radially outward for austere conditions and inward for non-austere conditions. The use of scavenge flow may control pressure loss due to possible excessive diffusion.

In some embodiments, the hub surface could be made of overlapping metallic surfaces ("leafs" or "turkey feathers") that allow for expansion and contraction of the local geometry using an internal actuator as shown in FIG. 4. In some embodiments, the hub height and curvature could be changed by a rotating drum attached to several metallic leafs as shown in FIG. 5. As the drum rotates in a first direction, the hub surface expands and as the drum rotates in an opposite second direction, the drum surface contracts.

In some embodiments, Shape Memory Alloy (SMA or smart metal) that changes when heated is used. Electrical heating elements may be employed under the surface to deform the hub surface to the desired shape for austere conditions as shown in FIG. 7. The surface may return to a low pressure loss shape for non-austere conditions as shown in FIG. 6.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A particle separator for use with a gas turbine engine, the particle separator comprising
    an adaptive-curvature inner wall arranged circumferentially about an axis,
    an outer wall arranged circumferentially about the adaptive-curvature inner wall to define an inlet passage of the particle separator, the inlet passage adapted to receive a mixture of air and particles suspended in the air,
    a splitter located radially between the outer wall and the adaptive-curvature inner wall to separate the mixture of air and particles into a clean flow substantially free of particles and a dirty flow containing the particles during operation of the particle separator, the splitter and the adaptive-curvature inner wall define an engine channel arranged to receive the clean flow, and the splitter and the outer wall define a scavenge channel arranged to receive the dirty flow, and
    a control system configured to detect a presence of the particles suspended in the air and to move selectively the adaptive-curvature inner wall between a non-austere arrangement in which the adaptive-curvature inner wall has a first maximum radius and an austere arrangement in which the adaptive-curvature inner wall has a second maximum radius greater than the first maximum radius in response to the control system detecting the presence of the particles,
    wherein the adaptive-curvature inner wall includes a plurality of overlapping leaves configured to slide relative to one another in response to the adaptive-curvature inner wall moving between the non-austere arrangement and the austere arrangement,
    wherein the plurality of overlapping leaves includes a first leaf and a second leaf located downstream of the first leaf, the first leaf and the second leaf each includes a fore end and an aft end spaced axially apart from the fore end, and the aft end of the first leaf is located radially outward of and overlaps the fore end of the second leaf,
    wherein one of the first leaf and the second leaf includes a pin and the other of the first leaf and the second leaf includes an axially extending pin-receiving slot that receives the pin,
    wherein the pin includes a stem and a head located at an end of the stem, and the slot includes a first section that is sized to receive the head and a second section that is sized to receive the stem and block the head from moving out of the slot in a direction outward from a top surface of the first leaf to couple the first leaf with the second leaf and the pin slides relative to the slot in the second section of the slot when the adaptive curvature inner wall moves between the non-austere arrangement and the austere arrangement,
    wherein the first leaf and the second leaf slide relative to one another along the path of the second section of the slot and do not rotate around an axis of the pin,
    wherein the plurality of overlapping leaves define an internal cavity that is in fluid communication with a pressurized air source to block particles from moving between the first lead and the second leaf into the internal cavity.

2. The particle separator of claim 1, wherein the control system includes a linear actuator configured to move the adaptive-curvature inner wall between the non-austere arrangement and the austere arrangement.

3. The particle separator of claim 1, wherein the control system includes a pneumatic bladder configured to move the adaptive-curvature inner wall between the non-austere arrangement and the austere arrangement.

4. The particle separator of claim 1, wherein the plurality of overlapping leaves includes a flap seal that extends from the aft end of the first leaf and seals against the forward end of the second leaf.

5. A method comprising
    providing a particle separator that includes an inner wall, an outer wall arranged around the inner wall to define an inlet passageway, and a splitter located between the inner wall and the outer wall,
    providing a mixture of air and particles suspended in the air to the inlet passageway,
    separating the mixture of air and particles suspended in the air into a dirty flow including substantially all the particles and a clean flow lacking substantially all the particles,
    detecting the particles suspended in the mixture of air and particles, and
    moving at least a portion of the inner wall toward the outer wall in response to detecting the particles,
    providing a pressurized fluid to an internal cavity and the internal cavity is defined by the inner wall,
    wherein the inner wall includes a first leaf and a second leaf, the first leaf overlaps the second leaf, and the moving step includes sliding the first leaf relative to and over the second leaf,
    wherein the pressurized fluid is configured to block particles from moving between the first leaf and the second leaf.

6. The method of claim 5, wherein the splitter and the inner wall define an engine channel, the splitter and the outer wall define a scavenge channel, the inlet passageway is in fluid communication with the engine channel and the scavenge channel, and the detecting step includes detecting particles in the inlet passageway.

7. The method of claim 5, wherein the splitter and the inner wall define an engine channel, the splitter and the outer wall define a scavenge channel, the inlet passageway is in fluid communication with the engine channel and the scavenge channel, and the detecting step includes detecting the particles in the engine channel.

8. The method of claim 5, wherein the splitter is fixed in position relative to the outer wall.

9. The method of claim 5, wherein the second leaf is located downstream of the first leaf, the first leaf and the second leaf each includes a fore end and an aft end spaced axially apart from the fore end, and the aft end of the first leaf is located radially outward of and overlaps the fore end of the second leaf.

10. The method of claim 9, wherein the plurality of overlapping leaves includes a flap seal that extends from the aft end of the first leaf and seals against the forward end of the second leaf.

11. The method of claim 10, wherein one of the first leaf and the second leaf includes a pin and the other of the first leaf and the second leaf includes an axially extending pin-receiving slot that receives the pin.

12. The method of claim 11, wherein the pin includes a stem and a head located at an end of the stem, and the slot includes a first section sized to receive the head and a second section sized to receive the stem and block the head from moving out of the slot to couple the first leaf with the second leaf.

13. The method of claim 5, wherein the inner wall includes a first leaf and a second leaf, the first leaf overlaps the second leaf, and the moving step includes sliding the first leaf relative to and over the second leaf, wherein the second leaf is located downstream of the first leaf, the first leaf and the second leaf each includes a fore end and an aft end spaced axially apart from the fore end, and the aft end of the first leaf is located radially outward of and overlaps the fore end of the second leaf wherein one of the first leaf and the second leaf includes a pin and the other of the first leaf and the second leaf includes an axially extending pin-receiving slot that receives the pin, wherein the pin includes a stem and a head located at an end of the stem, and the slot includes a first section that is sized to receive the head and a second section that is sized to receive the stem and block the head from moving out of the slot in a direction outward from a top surface of the first leaf to couple the first leaf with the second leaf and the pin slides relative to the slot in the second section of the slot when the adaptive curvature inner wall moves between the non-austere arrangement and the austere arrangement.

\* \* \* \* \*